United States Patent [19]
Dell et al.

[11] Patent Number: 6,052,818
[45] Date of Patent: Apr. 18, 2000

[54] METHOD AND APPARATUS FOR ECC BUS PROTECTION IN A COMPUTER SYSTEM WITH NON-PARITY MEMORY

[75] Inventors: Timothy J. Dell, Colchester; Marc R. Faucher, S. Burlington; Bruce G. Hazelzet, Essex Junction, all of Vt.

[73] Assignee: International Business Machines Corporation, Armonk, N.Y.

[21] Appl. No.: 09/032,153

[22] Filed: Feb. 27, 1998

[51] Int. Cl.[7] ................................................... G06F 11/10
[52] U.S. Cl. ........................ 714/773; 714/763; 714/772
[58] Field of Search .................................. 714/763, 767, 714/766, 772, 773

[56] References Cited

U.S. PATENT DOCUMENTS

| | | | |
|---|---|---|---|
| 4,827,478 | 5/1989 | Chan | 371/38 |
| 5,182,752 | 1/1993 | DeRoo et al. | 371/37.7 |
| 5,233,616 | 8/1993 | Callander | 371/37.7 |
| 5,289,477 | 2/1994 | Lenta et al. | 371/37.7 |
| 5,303,245 | 4/1994 | Shikakura et al. | 371/37.1 |
| 5,313,624 | 5/1994 | Harriman et al. | 395/575 |
| 5,355,377 | 10/1994 | Venkidu et al. | 371/51.1 |
| 5,367,526 | 11/1994 | Kong | 371/51.1 |
| 5,379,304 | 1/1995 | Dell et al. | 371/40.1 |
| 5,412,666 | 5/1995 | Squires et al. | 371/37.4 |
| 5,450,422 | 9/1995 | Dell | 371/40.1 |
| 5,455,939 | 10/1995 | Rankin et al. | 395/182.04 |
| 5,477,553 | 12/1995 | Kong | 371/51.1 |
| 5,515,381 | 5/1996 | Chan | 371/37.7 |
| 5,586,129 | 12/1996 | Chan | 371/51.1 |
| 5,623,506 | 4/1997 | Dell et al. | 371/40.1 |
| 5,923,682 | 7/1999 | Seyyedy | 371/40.18 |
| 5,956,351 | 9/1999 | Bossen et al. | 371/37.6 |

OTHER PUBLICATIONS

IBM Technical Disclosure Bulletin, vol. 32, No. 5B Oct. 1989, pp. 235–236. "Bus ECC For High Availability and Recovery In Real Time".

Primary Examiner—Stephen M. Baker
Attorney, Agent, or Firm—William N. Hogg

[57] ABSTRACT

An apparatus and method in which ECC bus protection capability can be generated on a memory card in conjunction with a computer system with a built-in ECC capability to reduce data transmission errors. Data generated by the system is transmitted to the card and stored in DRAMs. On a read cycle, the card generates a set of checkbits which are sent to the system on a checkbit bus. The system generates a set of checkbits from the data read from the memory card and compares these checkbits with those received from the memory card. A mismatch indicates transmission error on the bus(s) during a read cycle. Any correctable error is corrected. Data is invalidated if an uncorrectable error is detected. In another embodiment checkbits generated by the system during a write cycle are transmitted to the card an checkbits are generated by the card. These two sets of checkbits are compared and if there is a mismatch data is either flagged as bad or corrected. Furthermore, in one embodiment, if the memory card does "not know" in advance the type of ECC or H-matrix code resident in the computer system, the card has the capability to determine what H-matrix code is resident and set up a corresponding H-matrix.

19 Claims, 3 Drawing Sheets

READ PROTECTION ONLY FLOWCHARTS

READ/WRITE PROTECTION FLOWCHARTS

METHOD AND APPARATUS FOR ECC BUS PROTECTION IN A COMPUTER SYSTEM WITH NON-PARITY MEMORY

FIELD OF THE INVENTION

This invention relates generally to the use of an error correction ("ECC") system capable of generating and performing comparison of check bits in a computer system with non-parity memory that has ECC built into the computer system. In certain embodiments, system generated check bits are utilized to construct an H-matrix on a memory card.

BACKGROUND OF THE INVENTION

The data integrity requirements for personal computer systems have grown rapidly in the past few years. The speeds of personal computer central processing units ("CPU") and buses have steadily increased. For instance, speeds of 200 Mhz and 300 Mhz are currently achievable with CPUs attaining 1 GHz looming on the horizon. Furthermore, computer systems with bus speeds greater than 100 Mhz may tend to have a higher rate of data transmission errors when reading and writing to memory cards. This increase in errors occurs in part due to the increased noise of these systems. In these faster systems, while noise increases, the timing margin decreases. Computer systems that run at higher bus speeds provide less timing margin than slower systems. While the timing margin decreases in faster systems, and voltage is reduced to decrease power consumption, the higher speeds can increase the amount of noise generated by the system, and the reduced voltage can cause decreased noise margins. Furthermore, use of synchronous dynamic random access memory ("SDRAM") buses can exacerbate the problem of error occurrence due to noise. Thus, due to the increase of noise within a system, a dramatic increase in data errors can occur during data transmission, i.e., read and write cycles.

Moreover, the extra DRAM required for parity and error correction code ("ECC") can become prohibitively expensive for some markets. Also, since parity DRAMs are often produced in a different manner than other DRAMs, parity memory tends to be difficult to obtain. While parity is often eliminated from new computer systems, ECC is an inexpensive data error detection and correction mechanism. In many of today's standard computer systems, including the Pentium™ PRO microprocessor, ECC is built into the system.

These new systems with built-in ECC tend to have a 64 bit data bus with 8 check bits. Accordingly, while the means to control checkbits for ECC are provided by the system, many such systems do not include extra dynamic random access memory ("DRAM") that is required to support such checkbits. The existing DIMMs used in these systems, however, many times do not support ECC. Accordingly, a need exists to eliminate, or at least reduce, the high rate of data errors that can occur when these high speed systems read and write to memory cards. Also, a further need exists to utilize the ECC built-in to these computer systems.

SUMMARY OF THE INVENTION

The present invention provides an apparatus and method in which ECC bus protection capability can be generated on a memory card in conjunction with a computer system with a built-in ECC capability to reduce data transmission errors. Data generated by the system is transmitted to the card and stored in DRAMs. On a read cycle, the card generates a set of checkbits which are sent to the system on a checkbit bus. The system generates a set of checkbits from the data read from the memory card and compares these checkbits with those received from the memory card. A mismatch indicates transmission error on the bus(s) during a read cycle. Any correctable error is corrected. Data is invalidated if an uncorrectable error is detected. In another embodiment checkbits generated by the system during a write cycle are transmitted to the card, and checkbits are generated by the card. These two sets of checkbits are compared and if there is a mismatch data is either flagged as bad or corrected. Furthermore, in one embodiment, if the memory card does "not know" in advance the type of ECC or H-matrix code is resident in the computer system, the card has the capability to determine what H-matrix code is resident and set up a corresponding H-matrix.

Thus, it is an object of the present invention to provide ECC protection for data bus errors by providing a memory card that recognizes the system ECC and generator ECC on the card for comparison during a read cycle.

It is another object of the present invention to provide ECC protection for a high speed computer system having low noise margin.

It is yet another object of the present invention to provide a memory card which uses system ECC and on board ECC to reduce and flag data transmission errors.

Still a further object of the present invention is to provide a memory card which can determine which H-matrix a system is using for ECC, construct a similar H-matrix on the card, and generate checkbits on the card for comparison with the checkbits from the system.

DETAILED DESCRIPTION OF THE INVENTION

The present invention can exist in any number of environments in which a computer system has ECC capabilities built into the system, but will be described in the context of a computer system having an Intel Pentium® microprocessor. The present invention provides a memory card device having a logic chip so that a computer system to which the memory card is attached utilizes the system's built-in ECC capabilities to reduce transmission errors. In other words, the memory card generates an on board ECC capability on the card so that when used in conjunction with the system's built-in or native ECC, transmission errors are reduced with DRAM storage errors remaining unaffected. While the embodiment shown in FIGS. 1 and 2 of the present invention provides for protection against and correction for bus errors, the present invention does not protect against DRAM errors such as data corruption of information while data is stored, e.g. "soft" or "hard" DRAM error, nor does it correct any bus errors which occur on a write cycle.

Figure 1:
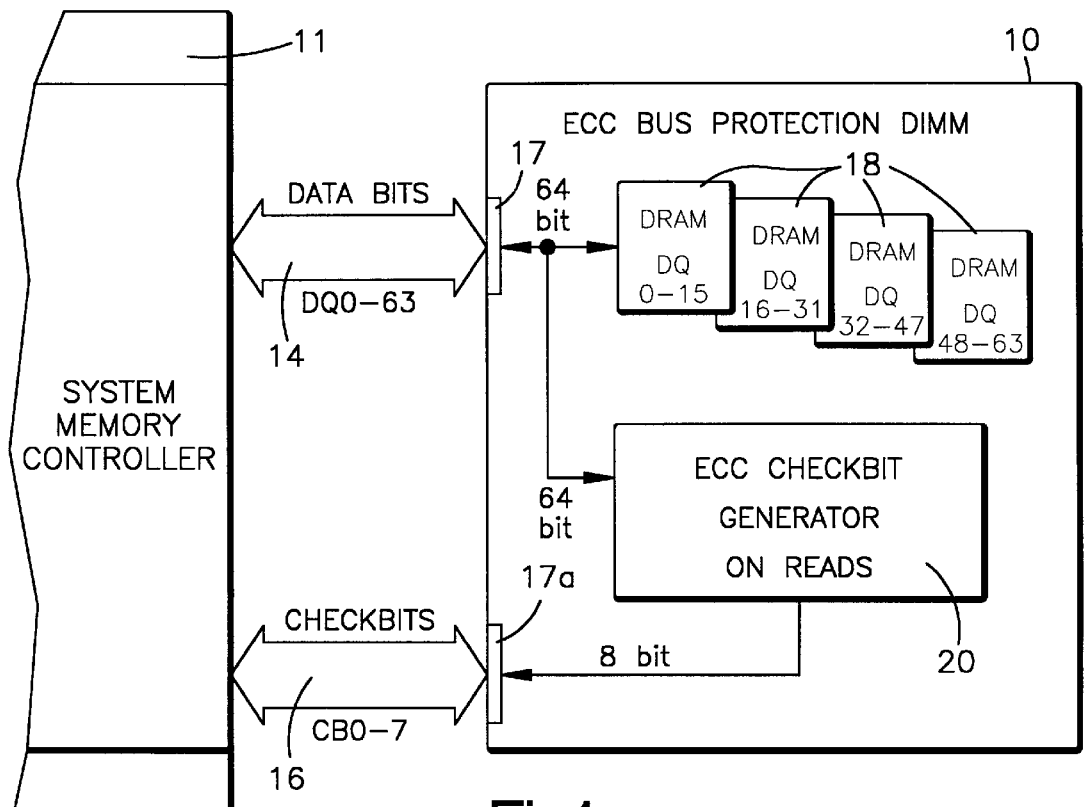
FIG. 1 is a functional block schematic of a read-only protection embodiment of a memory card apparatus of the present invention.

FIG. 1 illustrates a schematic embodiment of the present invention in which protection and correction of errors is performed only during computer system read operations. As best seen in FIG. 1, a memory card 10 is provided. The card 10 is connected to the motherboard (not shown) of a computer system 11 and is in communication with the system's memory controller 12. The memory card 10 can be a single or dual in-line memory module but will be described in the dual in-line memory module ("DIMM") environment. As stated above the system has a 64 bit data bus 14, with the data bits designated as DQ0-63, and an 8 bit check bus 16, with the check bits designated CB0-7. The card 10 has connector 17 to the data bus 14 and connector 17a to connect to the checkbit bus 16. The connector 17 and 17a may physically be a single part. Both the data bits and the checkbits may be passed from the DIMM to the computer system under control of the memory controller 12. The DIMM 10 is provided with DRAMs 18 and an ECC check bit generator 20. In this embodiment, four 1Mx16 DRAMs are provided. Each DRAM 18 is in communication with sixteen of the data bits on the data bus. As further illustrated in FIG. 1, the ECC check bit generator 20 taps into the data bus 16 and is also in communication with the check bit bus 16.

Figure 2:
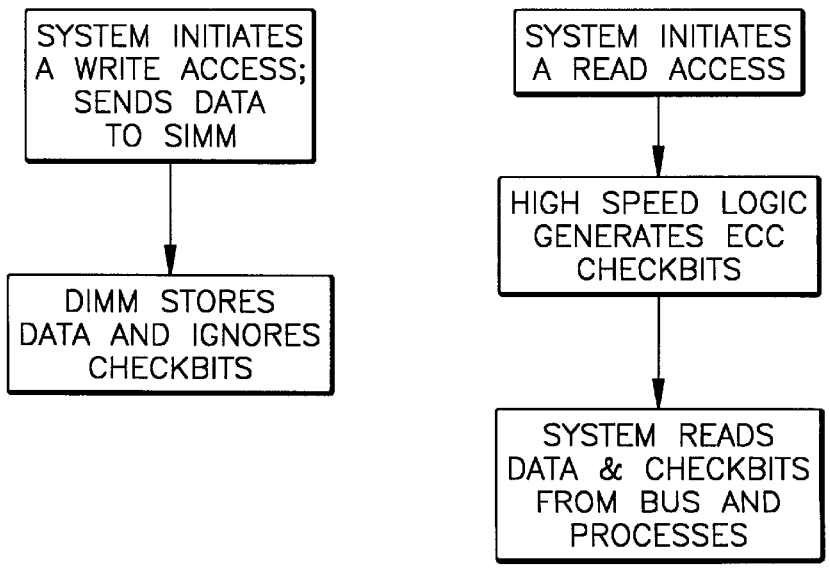
FIG. 2 is a flow chart of the read-only protection embodiment of the present invention.

FIG. 2 illustrates a flow chart describing the ECC bus protection of the embodiment of FIG. 1. As stated above, the embodiment shown in FIG. 1 provides read only protection for the data bus. If the system initiates a write access or operation, the subsequent data is sent via the data bus 14 to the DIMM 10. The DIMM stores the data and ignores the check bits generated by the system on bus 16. If the system initiates a read access, however, the ECC generator 20 on the DIMM generates checkbits which are sent to the system on checkbit bus 16 for comparison to the system's checkbits which are generated from the data delivered to the system on data bus 14. The system then, utilizing its built-in ECC capabilities, receives the data and the DIMM-generated checkbits from the DIMM and corrects errors, if any, accordingly. Thus, transmission errors from the DIMM 10 to the system are corrected by the DIMM providing the computer system the checkbits from the DIMM for comparison with checkbits generated by the system. Any DRAM errors which might occur, however, or any error in transmission on a write cycle are not corrected.

Figure 3:
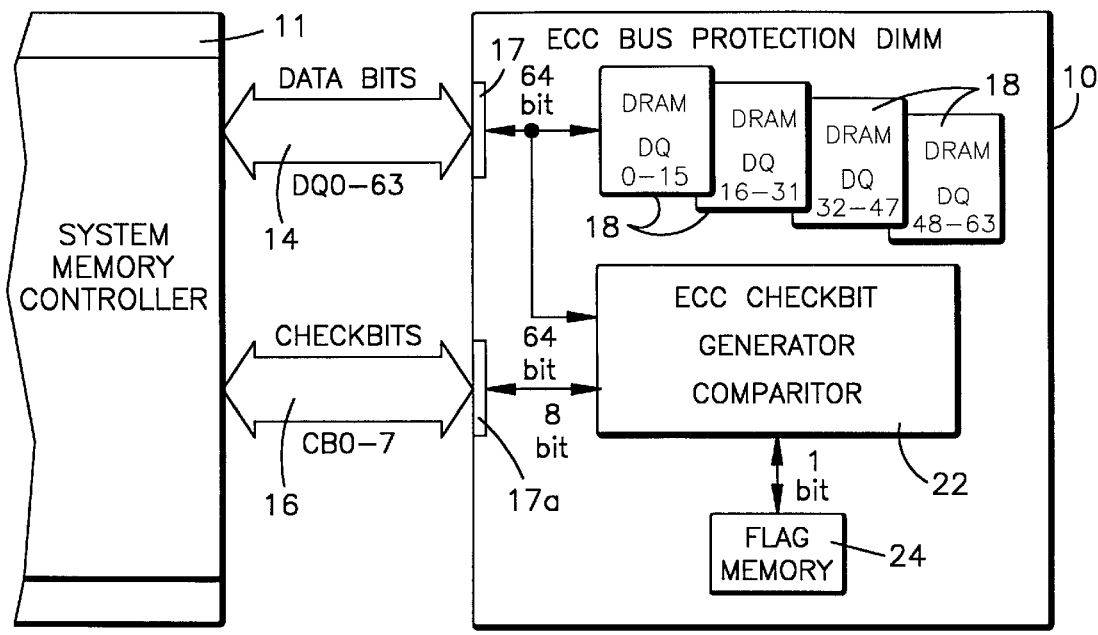
FIG. 3 is a functional block schematic of a read-write protection embodiment of the present invention.

FIG. 3 illustrates the read/write protection schematic of the present invention wherein both read and write protection is provided so that the ECC logic on the DIMM can correct bus errors during either a read or a write operation, but will not correct hard or soft errors in data storage in the DRAMs. In addition to the read protection of the previous embodiment, write protection is provided by storing a flag bit for each address. As best seen in FIG. 3, and as in the previous embodiment, four standard 1Mx16 DRAMs 18 are provided on the DIMM 10. These four DRAMs 18 are in communication with the 64 bit wide data bus 14. An ECC checkbit generator and comparitor 22 is also in communication with the data bus 14 as well as the checkbit bus 16 on which checkbits generated by the system's built-in or native ECC are transported. Also, the ECC checkbit generator and comparitor 22 is in communication with a flag memory 1Mx1 storage device 24.

If a write sequence is initiated by the system, the data is sent on the data bus 14 to the DIMM along with the system generated checkbits on checkbit bus 16. The DIMM ECC generator/comparitor 22 generates another set of checkbits which it then compares to the system's checkbits. If the generated checkbits are equivalent to the received checkbits, the data is uncorrupted, the flag memory bit is set to 0 in a well known manner and the data is stored. If, however, any one or more of the checkbits do not match when compared, the flag memory bit is set to 1 to indicate that the data is corrupted.

Figure 4:
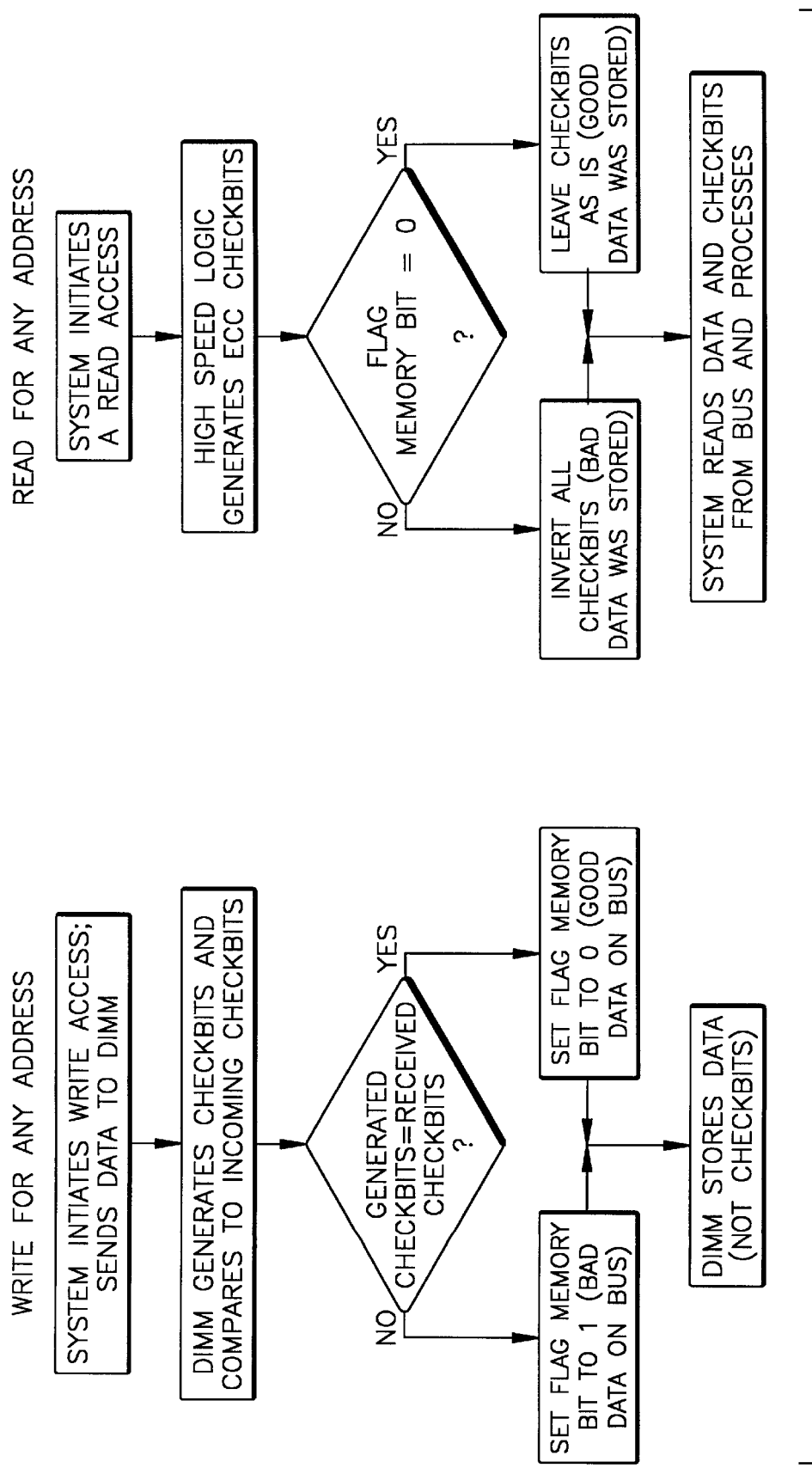
FIG. 4 is a flow chart of the read-write protection embodiment of the present invention.

As best illustrated by FIG. 4, if a system read is initiated, the DIMM provides the stored data bits and the checkbits generated by the checkbit generator/comparitor the system. If the flag bit for the read address had been set to "0," then the stored data is clean. If the flag bit for the read address had been set to "1," then the stored data is corrupted. In this case, all the checkbits just generated are logically complemented (i.e. inverted) and sent to the system. Since these checkbits will not match the checkbits generated by the system, this guarantees that the data read by the system will be identified as having an uncorrectable error. Moreover, if the flag bit had been set to zero, and the checkbits from the DIMM were not inverted onto the checkbit bus, but an error occurred on the data bus 14 or checkbit bus 16 during a read cycle, the data would be corrected if possible, or an uncorrectable error would be identified. However, if errors do not occur during transmission on either the read or the write cycle, the data is identified as good. Again, this embodiment does not identify or correct any hard or soft storage errors in the DRAM.

In this embodiment, it is also contemplated that the checkbit generator/comparitor could be provided with logic between data bus 14 and DRAMs 18 to correct errors identified by the ECC checkbit generator/comparitor. In such a case correctable errors of date during a write cycle can be corrected, in which case the flag memory would be set at "0".

The above described embodiments are predicated on the premise that the particular ECC scheme or H-matrix used by the system is known. In such a case the ECC generator 20 or ECC generator/comparitor 22 can be hard wired for such scheme or H-matrix. However, it is not always the case that the H-matrix of the system is known for a card to be used therewith, or it is often desirable for a card to be used irrespective of H-matrix of the system.

Figure 5:
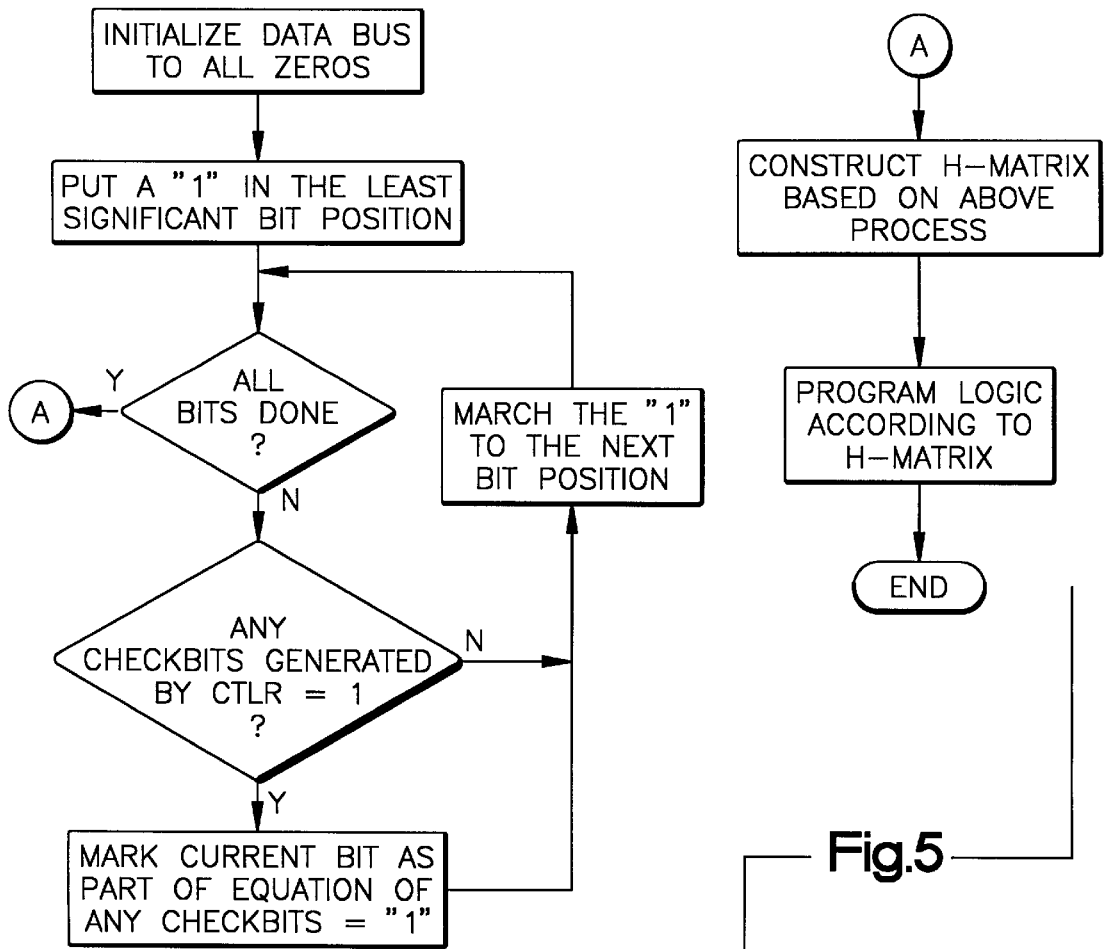
FIG. 5 is a flow chart of the H-matrix generating embodiment of the present invention.

FIG. 5 illustrates a functional block diagram of an embodiment of the present invention in which an H-matrix is not hard-coded onto the memory card. In this embodiment, an H-matrix determination and creation program is embedded in the ECC checkbit generator/comparitor 22. The H-matrix determination and creation scheme is included as follows. During initialization, the system does routine checks of the system and memory. For example, as can be seen in FIG. 5, to read the H-Matrix from the system onto the memory card, the data bus is initialized to all "0's". A "1" is placed in the least significant bit position and the data is written to the DIMM. All checkbits are examined, and if any check bit generated by the system is marked as a "1", it is included in the H-matrix. Then the system writes a zero to the first position and a "1" in the next most significant bit position. Again, the written checkbits are examined and the appropriate marks are generated in the H-matrix. This is continued until all bit positions are covered. This then determines how each of the data bits are used in the H-matrix. Then, the ECC checking and generating logic on the DIMM is programmed to perform the appropriate H-matrix ECC by virtue of the H-matrix it just determined. It should be noted that with all of these schemes, there is no requirement to store any checkbits. Thus, the expense of DRAM and use on real estate or the cards is avoided, while allowing errors caused by bus transmission to be identified and where possible corrected.

While the present invention has been illustrated by the description of the embodiment thereof, and while these embodiments have been described in considerable detail, it is not the invention to restrict or in any way limit the scope of the appended claims to such detail. Additional advantages and modifications may readily appear to those skilled in the art. Therefore, the invention, in its broadest aspects is not limited to the specific details, the representative apparatus, or the illustrative examples shown and described. Accordingly departures may be made from such details without departing from the spirit or scope of the applicants' general inventive concept.

We claim:

1. A memory module for connection to a computer system that has native error correction code capabilities and which memory modules do not have checkbit storage on board and which performs checkbit generation for error correction code comprising:

a) a memory card adapted to communicate with a computer system;
   b) at least one DRAM storage device on said memory card;
   c) a connector for connecting to a data bus for transmission of data bits between the memory module and the computer system;
   d) an error correction code checkbit generator on the memory card in communication with each said DRAM device for generating checkbits from data read from the DRAM device; and
   e) a connector for connecting to a checkbit bus for transmission of checkbits from said memory card to said system.

2. The invention as defined in claim 1 further characterized by said connector for the checkbit bus connected to allow the memory card to receive system generated checkbits from said system;

logic on said memory card to generate checkbits from data received on said data bus; and
   logic to compare checkbits generated by said checkbit generator with the checkbits received from the system.

3. The invention as defined in claim 2 further characterized by flag memory responsive to non matching system checkbits from said system and said checkbits generated by said checkbit generator on said memory card.

4. The invention as defined in claim 3 further characterized by logic to identify "bad" data flagged by said flag memory.

5. The invention as defined in claim 2 further characterized by logic on said memory card to correct correctable errors detected by comparison of the checkbits received from the system and checkbits generated on the memory card.

6. The invention as defined in claim 1 further characterized by logic to determine what H-matrix is used by said computer system for generating checkbits and to constitute and apply the determined H-matrix for the checkbit generator on said card.

7. A method of providing error correction code for errors caused by transmission on a data bus comprising the steps of:

providing a memory card adapted to communicate with a computer system;
   providing at least one DRAM storage device on said memory card;
   providing a connector for a data bus for transmission of data bits between the memory module and the computer system;
   storing data bits received from said system in said at least one DRAM storage device;
   generating error correction code checkbits on the memory card from data read from the DRAM storage device; and
   transmitting the checkbits generated on said memory card to said system.

8. The invention as defined in claim 7 further characterized by the memory supplying system generated check bits to said memory card;

generating checkbits from data received by the memory card; and
   comparing the checkbits generated on said card with the system generated checkbits.

9. The invention as defined in claim 8 further characterized by flagging any non matching system generated checkbits and said checkbits generated on said memory card.

10. The invention as defined in claim 9 further characterized by identifying "bad" data flagged by said flag memory.

11. The invention as defined in claim 9 further characterized by correcting correctable errors detected by comparison of the checkbits received from the system and checkbits generated on the memory card.

12. The invention as defined in claim 8 further characterized by determining on said card what H-matrix is used by said computer system for generating checkbits, and constituting and applying the determined H-matrix for the checkbit generation on said card.

13. A memory module which performs checkbit generation for error correction code comprising and which is adapted to connect to a computer system having native error correction code capabilities:

a) a memory card adapted to communicate with a computer system;
   b) at least one DRAM storage device on said memory card;
   c) a connector for connecting to a data bus for transmission of data bits between the memory module and the computer system;
   d) an error correction code checkbit generator on the memory card in communication with each said DRAM device for generating checkbits from data read from the DRAM device;
   e) a connector for connecting to a checkbit bus for transmission of checkbits from said memory card to said system; and
   f) logic to determine what H-matrix is used by said system for generating checkbits and constitutes and apply the determined H-matrix for the checkbit generator on the card.

14. In combination a computer system having native error correction code, and a memory module connected to said computer system and which memory modules do not have checkbit storage on board comprising:

a) at least one DRAM storage device on said memory card;
   b) a data bus for transmission of data bits between the memory module and the computer system;

c) an error correction code checkbit generator on the memory card in communication with each said DRAM device for generating checkbits from data read from the DRAM device; and d) a checkbit bus for transmission of checkbits from said memory card to said system.

15. The invention as defined in claim 14 further characterized by:

logic on said memory card to generate checkbits from data received on said data bus; and logic to compare checkbits generated by said checkbit generator with the checkbits received from the system.

16. The invention as defined in claim 15 further characterized by said memory card having flag memory responsive to non matching system checkbits from said system and said checkbits generated by said checkbit generator on said memory card.

17. The invention as defined in claim 16 further characterized by logic to identify "bad" data flagged by said flag memory.

18. The invention as defined in claim 16 further characterized by logic on said memory card to correct correctable errors detected by comparison of the checkbits received from the system and checkbits generated on the memory card.

19. The invention as defined in claim 15 further characterized by logic to determine what H-matrix is used by said computer system for generating checkbits and to constitute and apply the determined H-matrix for the checkbit generator on said card.

* * * * *